Patented Oct. 30, 1934

1,978,869

UNITED STATES PATENT OFFICE 1,978,869

MANUFACTURE OF REFINED GUTTA PERCHA, BALATA, AND THE LIKE

Willoughby Statham Smith, Benchams, Newton Poppleford, Henry Joseph Garnett, Lymne, Solefields, Sevenoaks, and John Norman Dean, Orpington, England No Drawing. Application November 10, 1930, Serial No. 494,816. In Great Britain November 14, 1929

8 Claims. (Cl. 18—49)

This invention relates to the preparation or production of refined gutta percha, balata and the like.

Raw gutta percha comes on to the market in a large number of different qualities, all of which have to be purified by treatment before they can be used in the arts. The value of the raw product is determined by the proportion and quality of the gutta therein. The number of chemically distinct substances present in raw gutta percha is undoubtedly very large, but for the sake of convenience, these substances are generally grouped by those engaged in this manufacture in four divisions, namely, gutta, resin, dirt and moisture. The resin fraction consists mainly of esters of alcohols of high molecular weight with different acids. The dirt fraction comprises not only the accidental impurities, such as sand, earth and particles of bark, but includes all the materials present that are not classed as gutta, resin or moisture. The purifying treatment to which the raw material is subjected, as mentioned above, before use in the arts, consists in the removal of most of the dirt and sometimes of a proportion of the resin, and is thus a concentration of the gutta.

The gutta, which is the valuable thermoplastic material, has hitherto been supposed to be a hydrocarbon of the formula, as determined by elementary analysis ($C_5H_8$), and actually consisting of high and varying polymers of this.

It is known that the quality of gutta percha is deteriorated as a result of ageing. It is generally believed that this deterioration is caused by partial oxidation and depolymerization. The gutta obtained from deteriorated samples of gutta percha is relatively soft and sticky at a temperature at which plasticity normally just shows itself. As the deterioration progresses, the gutta becomes more and more brittle when cold, and soft and sticky when hot, until in the end it has entirely lost its characteristic properties and has been converted into resinous bodies.

A close investigation of the phenomena attending the absorption of oxygen by the gutta hydrocarbon has revealed that the first products thus formed, contain a minute percentage of oxygen, closely resemble gutta in the earlier stages of deterioration.

It has also been found that oxygenated products and lower polymers are often present in guttas, especially in deteriorated samples.

By the presence of such contaminating products which may result from ageing or other causes, an otherwise high grade gutta may be rendered inferior in its properties and usefulness in the arts, e. g. the manufacture of insulating material.

The object of the present invention is to remove low grade constituents of deteriorated or inferior gutta, and so produce from the latter a gutta of improved properties.

In pursuance of this object, we have found that the low grade or contaminating constituents, though resembling the gutta hydrocarbon in many respects, for example, in their insolubility in acetone or acetone-benzene mixture, can be distinguished from it by their different solubility in certain solvents. Thus it has been found that there are a number of solvents which are capable of dissolving both the high and low grade gutta percha, but which, when employed under certain conditions act in a selective manner upon the gutta in that they dissolve only the contaminating products of low grade gutta, whereas the true gutta hydrocarbon is only swollen by treatment therewith.

Thus other solvents, capable of dissolving the gutta at or above a certain temperature, will at the most swell the high grade gutta at a somewhat lower temperature, but will nevertheless still dissolve contaminating constituents. As an instance of this, benzene may be mentioned. Benzene at 19° C. or thereabouts will only swell the high grade gutta, but it will at that temperature, dissolve contaminating constituents. The homologues of benzene, e. g. toluene act similarly at appropriate temperatures. Petroleum ether is another example, and this solvent, specific gravity about 0.70, acts selectively at about 35 to 37° C.

The process of the invention accordingly consists in extracting degraded or low grade gutta from a body of gutta contaminated therewith by the selective action of a solvent of such nature or employed under such conditions that the high grade gutta is at the most swelled, whilst the undesired contaminating constituents are dissolved. Repeated extraction may be employed and in some cases a sequence of two or more different solvents is employed with advantage.

The exact temperature to employ with any particular solvent will depend on the amount or range of lower grade material it is desired to remove. The moderately good, but not top, grade material will be soluble at temperatures near the true soluble point of the hydrocarbon. On the other hand, at too low a temperature, only the very worst deteriorated substances will be removed. The proper temperature to employ for obtaining a product with the properties required from a particular body of material, and using a particular solvent, may be determined by trial and examination of the products obtained when working within a range of temperatures.

When the process is applied to gutta percha containing resin, the latter will be extracted by the solvent or solvents together with the low grade gutta. It may, however, be desired to replace resin in the product after the treatment in order to impart softening properties, and in such a case it is preferable to extract the resin alone by an appropriate previous treatment with a solvent so that the resin may be readily recovered.

According to one method of carrying the invention into effect, gutta which has deteriorated or has otherwise become contaminated with low grade gutta is first extracted with benzene at 19° C. The gutta percha, preferably in sheet form, is immersed in the solvent, which is then brought to the required temperature. The selective action will be complete in about an hour, or longer if the gutta should not be in such a fine state of division. The jelly of gutta hydrocarbon is removed as a coherent piece or pieces from the mother liquor, and is washed in fresh benzene at 19° C.

In some cases, the gutta percha may be subjected to a series of treatments with the same or more than one solvent. When different solvents are employed, ethyl acetate which is not a solvent for high grade gutta percha, may be used. For example, the partly purified gutta obtained from treatment with benzene may then be subjected to the complementary treatment by extraction and washing with the boiling ethyl acetate, after which the solvent in the swollen gutta hydrocarbon is removed, e. g. by treatment in a vacuum.

When benzene is employed as the solvent it will be found that the limiting temperatures in both directions are about 17°-25° C. that is to say, above 25° C. far too much of the good or high grade gutta is dissolved, whereas below 17° C. the so-called low grade gutta is insoluble. The corresponding temperature limits for petroleum ether are from about 32°-40° C. Toluene behaves in a manner very similar to benzene and the selective temperature is about 19° C. It has been observed that gutta percha as a whole dissolves at temperatures slightly lower than balata. The actual "selection temperature" also varies slightly with different kinds of gutta percha.

Alternatively, treatment may be carried out by the following method which, however, has not been found as suitable as the treatment with a solvent at a fixed temperature.

A solution of the gutta percha is made in the solvent, e. g. benzene, and the solution is cooled to a temperature just below 19° C. and kept there until the gutta hydrocarbon "freezes out" when the solution is warmed to 19° C. and the precipitated gutta is strained off from the mother liquor. Sometimes this solution "freezes" to a jelly, but if this is thoroughly shaken or beaten, it will be transformed into a more granular condition, when it may more readily be removed.

When cold benzene or nearly cold petroleum ether, or in fact any solvent that has to be used below 60° C. is used for the purposes of selectively extracting the gutta percha, and, if the gutta percha has previously been heated in such a way as to heat treat it even unintentionally, as is described in British specification No. 326,481, or for example if it has been treated with boiling acetone (B. P. 56° C.) with the object of extracting the resins, it will be found that the soluble part of the gutta percha will have been rendered practically insoluble in e. g. benzene at 19° C. so that the above described treatment will not be effective.

This resistance to the extractive action of the solvent may be overcome by first heating the gutta percha to a temperature above 60° C., when the effects of heat treatment will be destroyed. For this purpose, the gutta percha may be heated in boiling water and then passed through sheeting mills, so as to expose a large surface of the material to the action of the solvent.

The product thus obtained is found to have properties considerably better than those of the untreated material, and in some cases, indeed, better than those possessed by the gutta percha before deterioration had set in.

The breaking strain may be taken as a criterion of the quality of the hydrocarbon.

A sample of poor quality gutta percha yielded the following results before and after treatment with boiling ethyl acetate:—

Breaking strain
Before treatment_____ 2670 lbs. per square inch
After treatment_____ 3200 lbs. per square inch Another sample of poor quality gutta percha yielded the following results before and after treatment with benzene at 19° C.

Breaking strain
Before treatment_____ 3569 lbs. per square inch
After treatment_____ 4048 lbs. per square inch It is thus possible to separate the fraction of good quality horny gutta from the deteriorated product.

The process is applicable to all commercial grades and types of gutta percha, and it is likewise applicable to balata.

The process of the invention may be applied with advantage to the production of gutta percha from the leaf. Two methods of obtaining gutta percha from the twigs and leaves of the gutta percha tree are known. In the mechanical method, the leaves are ground and then treated with hot water, when the gutta percha floats up to the surface and is removed. In the other method, the resin may first be removed by treatment with acetone, and the gutta percha is extracted from the leaves by a solvent. Greater yields are obtained by this second method, but the product contains large quantities of waxy sticky products which cannot be removed by the ordinary methods. When the product obtained by the extraction of the leaves of the gutta percha tree is treated by the method in accordance with the invention, gutta percha of excellent quality is obtained, both wax and low grade gutta being extracted.

In the accompanying claims, the term "gutta percha" is to be read as including balata and like allied gums.

What we claim is:—

1. A method for the manufacture of refined gutta percha which comprises subjecting the gutta percha to the selective action of a solvent which is capable of dissolving both the high and low grade gutta, but which is employed under such conditions that the high grade gutta percha is at the most caused to swell while the low grade gutta is dissolved and then separating the solution of the low grade gutta percha from the residue of the high grade gutta percha.

2. A method for the manufacture of refined gutta percha which comprises subjecting the gutta percha to a series of treatments with a solvent which is capable of dissolving both the high and low grade gutta, but which is employed under such conditions that the high grade gutta percha is at most swelled while the low grade gutta percha is dissolved, the solution of the low grade gutta percha being separated from the residue of the high grade gutta percha after each treatment.

3. A method for the manufacture of refined gutta percha which comprises subjecting the gutta percha to a series of treatments with a number of different solvents, each one of which is capable of dissolving both the high and low grade gutta, but which is employed under such conditions that the high grade gutta percha is at the most swelled while the low grade gutta percha is dissolved, the solution of the low grade gutta percha being separated from the residue of the high grade gutta percha after each treatment.

4. A method for the manufacture of refined gutta percha which comprises subjecting the gutta percha to the selective action of a solvent selected from the group consisting of benzene or its homologues and petroleum ether, such that the high grade gutta percha is at the most caused to swell while the low grade gutta percha is dissolved and then separating the solution of the low grade gutta percha from the residue of the high grade gutta percha.

5. A method for the manufacture of refined gutta percha which consists in subjecting the gutta percha successively to a selective treatment with benzene by controlling the temperature of solution such that the high grade gutta is at the most caused to swell while the low grade gutta is dissolved, and separating the solution of the low grade gutta percha from the residue of the high grade gutta percha after each treatment.

6. A method for the manufacture of refined gutta percha as claimed in claim 1 in which the gutta percha is previously subjected to the action of a solvent to remove the resin.

7. A method for the treatment of refined gutta percha according to claim 4 wherein the temperature of the benzene does not exceed approximately 19° C. and the temperature of the petroleum ether does not exceed approximately 37° C.

8. A method for the manufacture of refined gutta percha which consists in dissolving the gutta percha in a solvent capable of dissolving both the high grade and low grade gutta percha, then cooling the solution to a temperature slightly below a predetermined temperature at which predetermined temperature the low grade gutta percha will be dissolved and the high grade gutta percha will at the most be swelled, then raising the solution to said predetermined temperature, and then separating the solution containing the low grade gutta percha from the residue.

WILLOUGHBY STATHAM SMITH.
HENRY JOSEPH GARNETT.
JOHN NORMAN DEAN.